United States Patent [19]
Arnaune

[11] Patent Number: 4,808,970
[45] Date of Patent: Feb. 28, 1989

[54] DECODING DEVICE FOR CMI CODE

[75] Inventor: Jean-Pierre Arnaune, Draveil, France

[73] Assignee: Societe Anonyme de Telecommunications, Paris, France

[21] Appl. No.: 870,381

[22] Filed: Jun. 4, 1986

[30] Foreign Application Priority Data

Apr. 28, 1986 [FR] France ................... 86 06096

[51] Int. Cl.⁴ ............................................. H03N 5/04
[52] U.S. Cl. ................................................... 341/73
[58] Field of Search ............... 340/347 DD; 375/45, 375/47, 55, 84, 87; 360/40–43

[56] References Cited

U.S. PATENT DOCUMENTS

| | | | |
|---|---|---|---|
| 3,627,907 | 12/1971 | Diggelmann . | |
| 3,914,760 | 10/1975 | Logue | 340/347 M X |
| 3,949,394 | 4/1976 | Kennedy | 235/449 X |
| 3,953,673 | 4/1976 | Dorward | 375/45 |
| 3,992,581 | 11/1976 | Davis . | |
| 4,321,483 | 3/1982 | Dugan . | |
| 4,325,053 | 4/1982 | Le Brozec et al. | 340/347 DD |
| 4,556,868 | 12/1985 | Harle | 340/347 DD |
| 4,562,422 | 12/1985 | Pospischil | 340/347 DD |

FOREIGN PATENT DOCUMENTS 3310713 9/1984 Fed. Rep. of Germany .
2495408 6/1982 France .

Primary Examiner—Bernard Koskoski
Attorney, Agent, or Firm—Stevens, Davis, Miller & Mosher

[57] ABSTRACT

In a device for CMI code decoding, a detector of certain transitions between pairs of the coded signal delivers a signal for synchronizing a clock recovery circuit. A decoding circuit receives the coded signal and the clock signal and delivers the decoded signal.

4 Claims, 5 Drawing Sheets

DECODING DEVICE FOR CMI CODE

BACKGROUND OF THE INVENTION

1. Field of the Invention

The present invention relates to a decoding device receiving a coded succession of bits and delivering a decoded succession of bits, said coded succession being obtained by coding a succession of bits to be coded by converting each bit to be coded into two successive bits, a bit to be coded having one or other of two values which are associated, one with a single one of the pairs of different coded bits and the other alternately with one and other of the two pairs of identical coded bits, the decoding device comprising clock recovery means controlled by said coded succession and delivering a clock signal of a period equal to the duration of a pair of bits of said coded succession, and means for decoding the pairs, receiving said coded succession and said clock signal and delivering said decoded succession.

Coding of the above type, in which a bit to be coded of value 0 is converted into the pair of bits 01, for example, and a bit to be coded of value 1 is converted alternately into the pair 00 and into the pair 11 is usually called coded mark inversion or CMI coding.

The advantages of such coding are the spectral properties and the redundance of the coded signal, which facilitate transmission thereof as well as the detection of errors during this transmission.

2. Description of the Prior Art

A device of the above type is already known from the French Pat. No. 2 024 873. In this device the clock recovery means are such that the clock signal is set, with respect to the coded succession received, so that its rising fronts are in phase, or in phase opposition with the transitions between pairs of the coded succession. The factors which cause the clock signal to lock in phase or in phase opposition may be considered as random. The result is that there is one chance out of two that the decoding means, controlled by the clock signal, decodes the true pairs of bits of the coded signal and output a correct decoded signal. In the opposite case, the decoding means decode false pairs and the output signal is incorrect. To overcome this ambiguity, the decoding means of the above mentioned patent are adapted for detecting the unused pair of different coded bits, or prohibited pair, here the pair 10, and for acting on the clock recovery means so as to shift the clock signal by a half period should the prohibited pair be detected.

This device has, on the one hand, the drawback of requiring detection means adapted for detecting the prohibited pair and, on the other hand, the disadvantage of delivering an incorrect output signal as long as the prohibited pair has not been detected, in the case where the clock signal is badly locked at the outset.

The present invention aims at overcoming these drawbacks.

SUMMARY OF THE INVENTION

For this, it provides a decoding device of the above type in which means are provided for detecting transitions between pairs of said coded succession and synchronizing said clock recovery means.

With the device of the invention, it is no longer necessary to detect the prohibited pair and the correct coded signal is output immediately.

Advantageously, said detected transitions are identical to the transition of the other one of said pairs of different coded bits.

In fact, since the other one of said pairs of different coded bits, here pair 10, is prohibited, a transition identical to that of the prohibited pair corresponds necessarily to a transition between pairs of the coded succession, none of the authorized pairs, here pairs 00, 11 and 01 having a transition of this type.

Still advantageously, said clock recovery means comprise a time shift comparator and a controllable oscillator delivering an output signal, arranged so as to form a loop for controlling the time shift between each said detected transition and the following rising front of said output signal of said oscillator.

In the preferred embodiment of the device of the invention, said clock recovery means also comprise a frequency divider, receiving said output signal from the oscillator and delivering said clock signal, said frequency divider being brought into phase by said means for detecting the transitions.

In this case, the performances of the control loop are improved.

BRIEF DESCRIPTION OF THE DRAWINGS

The present invention will be better understood from the following description of the preferred embodiment of the decoding device of the invention, with reference to the accompanying drawings in which.

DESCRIPTION OF THE PREFERRED EMBODIMENTS

Figure 1:
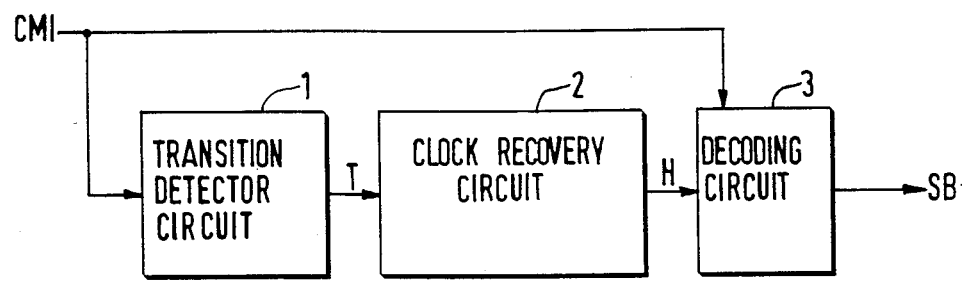
FIG. 1 shows a block diagram of a decoding device.

Referring to FIG. 1, a decoding device receives a coded succession of bits CMI and delivers a decoded succession of bits SB.

The coded succession CMI was obtained, using means similar to those described in French Pat. No. 2 024 873, by coding a succession to be coded while converting each bit to be coded in two successive bits, that is to say a pair of bits. The flow of the coded succession CMI is therefore twice the flow of the succession to be coded.

The coding law is here such that a bit to be coded of value 0 is converted into the pair of bits 01 and a bit to be coded of value 1 is converted alternately into the pair 00 and the pair 11. The pair 10, not used, is called prohibited pair. The coding law is summed up in the following table:

| bit to be coded | pair of coded bits |
| --- | --- |
| 0 | 01 |
| 1 | alternately 00 & 11 |

Figure 2:
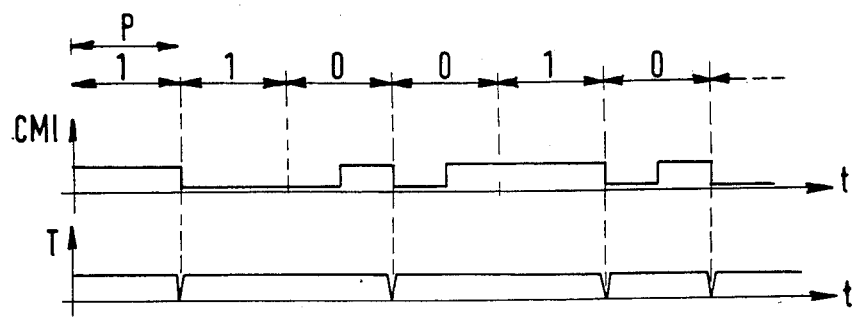
FIG. 2 shows a signal timing diagram of the device of FIG. 1.

The upper part of FIG. 2 gives a coding example: the succession to be coded is represented by a succession of value 0 or 1 of duration P, and the coded succession is represented by the timing diagram of the CMI signal, the duration of a pair of coded bits being equal to P.

The spectrum and the redundancy of the CMI signal make it less sensitive to transmission disturbances. Such a signal is therefore generally used for transmitting information between a transmitter and a receiver. The decoding device of the invention forms then part of the receiver and its function is to deliver, from the coded CMI signal received, the decoded signal SB which must then be identical, except for a delay, to the original signal to be coded.

The coding device comprises, connected in cascade, a transition detector circuit 1, a clock recovery circuit 2 and a decoding circuit 3.

The transition detector circuit 1 receives the CMI signal and delivers a signal T to the clock recovery circuit 2. This latter delivers a signal H to the decoding circuit 3 which, receiving in addition the signal CMI, delivers at its output the decoded signal SB.

Before describing the construction of each of the blocks 1, 2, and 3 in detail, we will describe the operation thereof.

As shown in FIG. 2, the signal T is a signal which is always at the high level, except during the negative transitions, from 1 to 0, of the signal CMI, that is to say here the transitions identical to those of the prohibited pair Now, the coding is such that a transition of this type can only coincide with a transition between two pairs of bits of the coded succession CMI, each corresponding to an original bit to be coded. In fact, a bit to be coded of value 0 gives rise to a pair 01 with positive transition, from 0 to 1, and a bit to be coded of value 1 gives rise to a pair 00 or 11 without any transition. Thus, the brief low level pulses of the signal T each correspond necessarily to a transition between pairs. Naturally, all the transition—between pairs, on the other hand, do not give rise to a low level pulse of the signal T.

Figure 6:
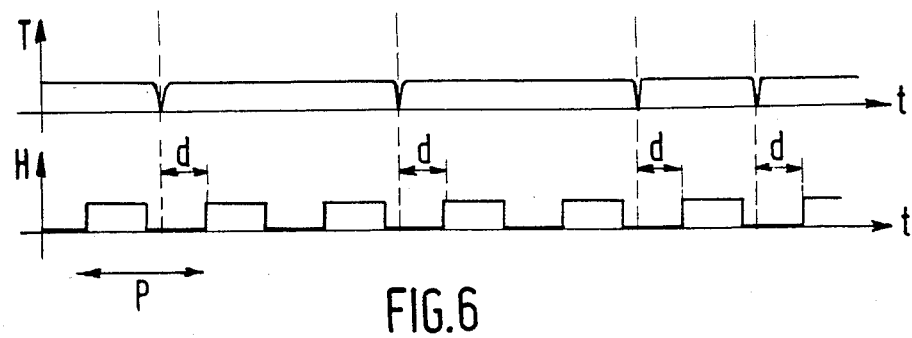
FIG. 6 shows a timing diagram of the signals at the input and at the output of the clock recovery circuit of FIG. 4 or of FIG. 5.

As shown in FIG. 6, the signal H at the output of the clock recovery circuit 2 is a periodic signal of period P equal to the duration of a pair, time locked so that the time shift d between a low level pulse of the signal T and the following rising front of the signal H remains constant, and here less than the half period P/2.

Figure 12:
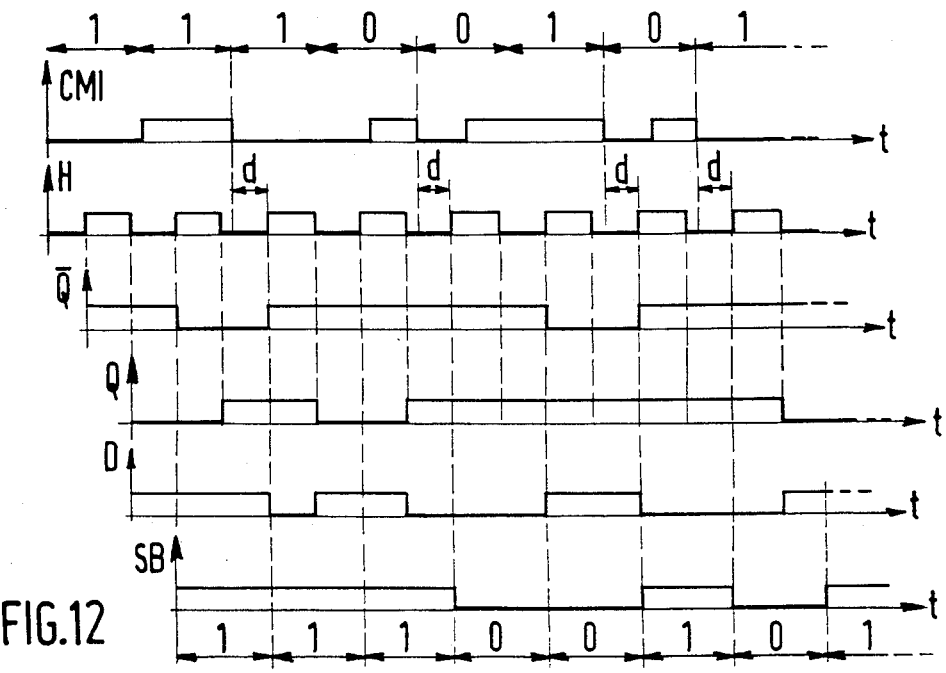
FIG. 12 shows a timing diagram of the signals of the decoding circuit of FIG. 11.

As shown in FIG. 12, because of the correct locking of the signal H with respect to the transitions between pairs of the signals CMI, the decoding circuit 3 decodes the pairs of the signal CMI for delivering the signal SP, without ambiguity and without error.

Figure 3:
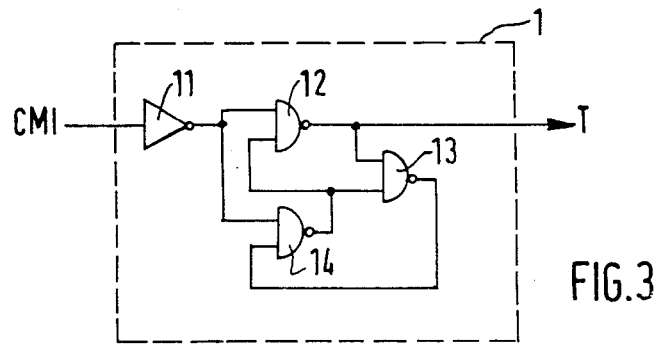
FIG. 3 shows the detail diagram of the transition detector circuit of the device of FIG. 1.

Referring now to FIG. 3, the transition detector circuit 1 here comprises an inverter 11, having an input receiving the signal CMI and an output. An $\overline{\text{AND}}$ gate 12 has a first input connected to the output of the inverter 11, a second input and an output delivering the signal T. An $\overline{\text{AND}}$ gate 14 has a first input connected to the output of the inverter 11, a second input and an output connected to the second input of the $\overline{\text{AND}}$ gate 12. An AND gate 13 has a first input connected to the output of the $\overline{\text{AND}}$ gate 12, a second input connected to the output of the $\overline{\text{AND}}$ gate 14 and an output connected to the second input of the $\overline{\text{AND}}$ gate 14.

The operation of the transition detector circuit 1 is as follows. When the signal CMI is at the high level, the output signal of the inverter 11 is at the low level, the output signals of the $\overline{\text{AND}}$ gate 12 and 14 are at the high level and the output of the $\overline{\text{AND}}$ gate 13 is at the low level. The signal T is at the high level.

Immediately after a negative transition of the signal CMI, the output signal of the inverter 11 passes to the high level, the output of the $\overline{\text{AND}}$ gate 12 passes to the low level. But this situation does not last for the output of the $\overline{\text{AND}}$ gate 13 passes to the high level, then the output of the $\overline{\text{AND}}$ gate 14 passes to the low level, which causes the output of the $\overline{\text{AND}}$ gate 12 to come back to the high level. The state reached is then stable. Thus, a negative transition of the signal CMI results in a negative pulse, of a duration substantially equal to twice the propagation time in a gate, on the signal T.

When the signal CMI undergoes a positive transition for passing again to the high level, the output signal of the inverter 11 passes to the low level. The state of the output of the $\overline{\text{AND}}$ gate 12 remains unchanged. That of the output of the $\overline{\text{AND}}$ gate 14 changes so as to pass to the state which has already been described. A positive transmission of the signal CMI has therefore no influence on the signal T, whose trend is the one shown in FIG. 2.

Figure 4:
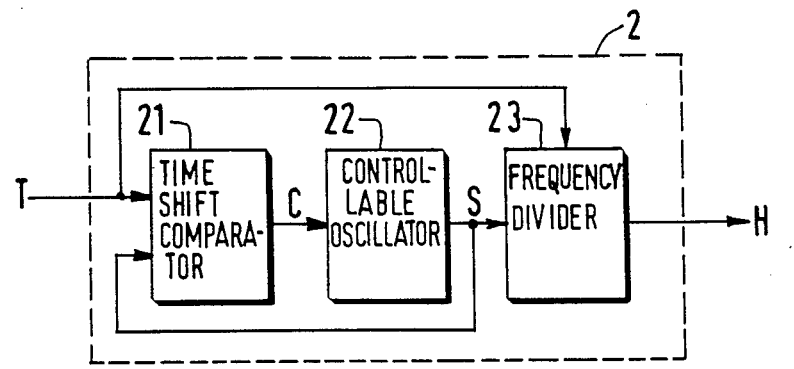
FIG. 4 shows a diagram of the clock recovery circuit of the device of FIG. 1.

Referring now to FIG. 4, the clock recovery circuit 2 comprises a time shift comparator 21, a controllable oscillator 22 and a frequency divider 23.

The time shift comparator 21 has a first input receiving the signal T, a second input, and an output delivering signal C.

The controllable oscillator 22 is provided with a control input receiving the signal C and an output delivering a signal S, connected to the second input of the time shift comparator 21.

The frequency divider 23 has an input receiving the signal S and an output delivering the signal H, whose frequency is here equal to half the frequency of signal S. The frequency divider 23 also has a phasing input receiving the signal T.

The operation of the clock recovery circuit 2 will now be explained.

The controllable oscillator 22 delivers the signal S, whose period, equal to P/2, half of the duration of a pair, is variable within a relative variation range here equal to $\mp 5.10^{-5}$, as a function of the voltage received at its control input. The design of such a controllable oscillator is within the scope of a man skilled in the art and will not be described further.

Figure 8:
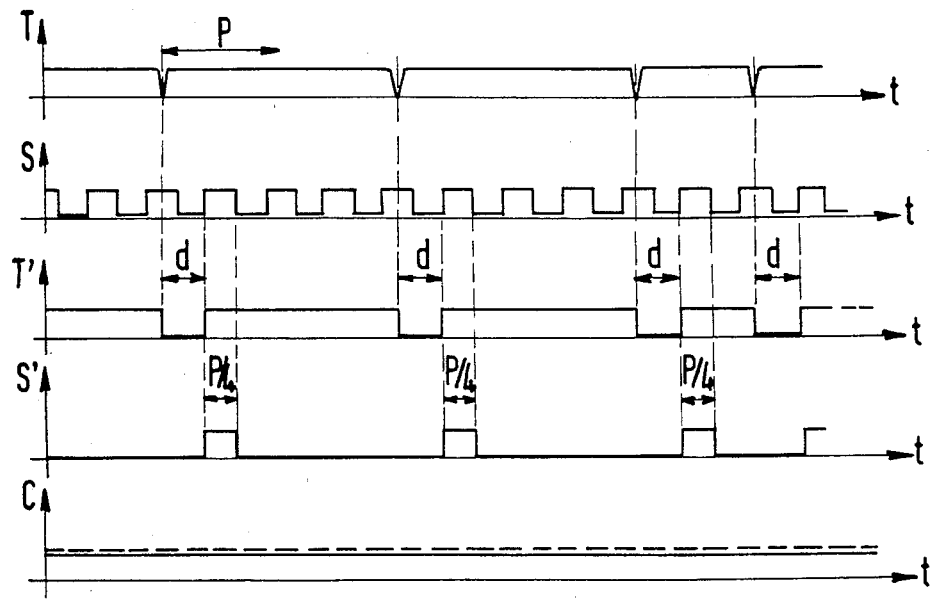
FIG. 8 shows a timing diagram of the signals of the time shift comparator of FIG. 7.

As will be explained hereafter, and as is shown in FIG. 8, the time shift comparator 21 delivers a signal C whose mean DC voltage depends on the time shift d between each low level pulse of signal T, that is to say a transition between pairs detected by circuit 1, and the next rising front of the signal S output by the oscillator.

With signal C applied to the control input of the controllable oscillator 22, a loop for controlling the time shift—d is formed, which ensures perfect synchronism between the signal T and the signal S.

Figure 10:
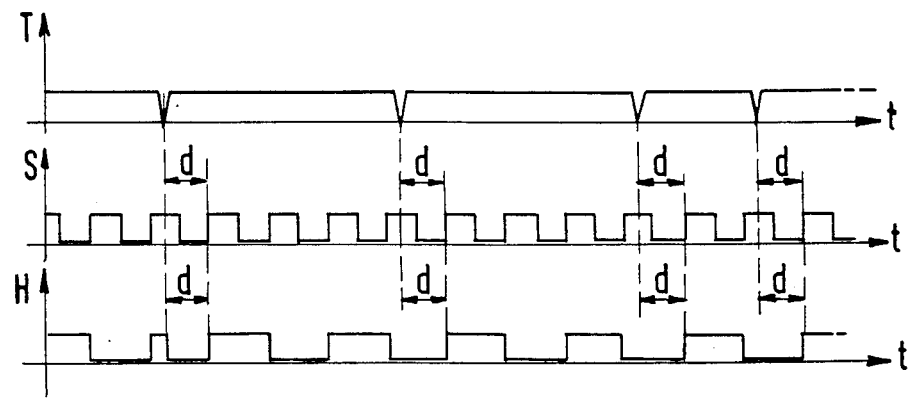
FIG. 10 shows a timing diagram of the signals of the divider circuit of FIG. 9.

As will be seen hereafter, the frequency divider 23 is adapted for delivering a signal H whose frequency is half that of the signal S and whose phase is such that the time shift between a low level pulse of signal T and the next rising front of the signal H remains equal to d, so constant, as is shown in FIG. 10.

Figure 7:
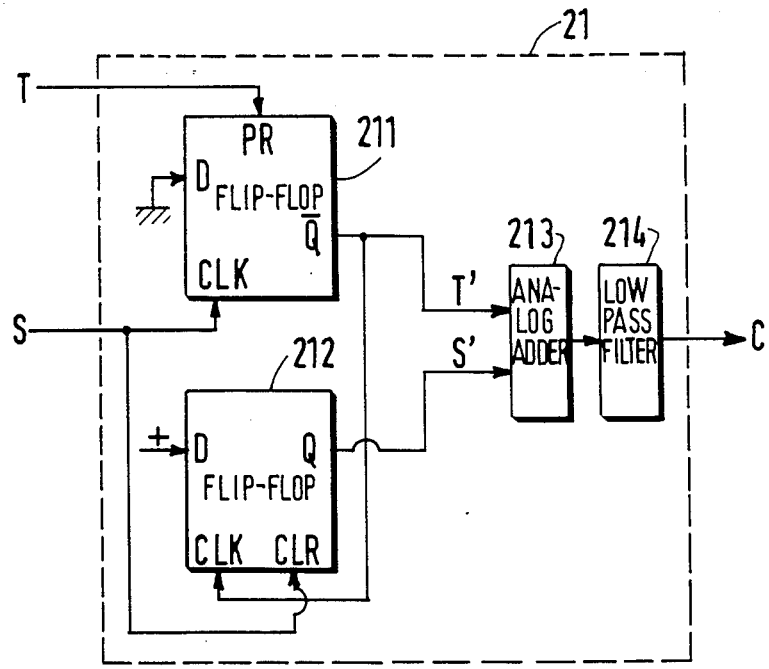
FIG. 7 shows a detailed diagram of the time shift comparator of the clock recovery circuit of FIG. 4.

Referring to FIG. 7, the time shift comparator 21 comprises two D flip flops 211 and 212, an analog adder 213 and a low pass filter 214.

Flip flop 211 has an input D connected to ground, an output $\overline{Q}$ delivering a signal T', an input for resetting the output $\overline{Q}$, receiving the signal T, and a clock input receiving the signal S.

Flip flop 212 has an input D connected to a supply voltage at the logic high level, delivered by an electric power supply circuit, not shown for the sake of simplicity, which supplies all the other circuits of the device in a known way. Flip flop 212 has further an output Q delivering the signal S', an input for resetting the output Q, receiving the signal S, and a clock input receiving the signal T'.

The analog adder 213 has two inputs receiving the signals T' and S' and an output connected to the input with which the low pass filter 214 is provided, which delivers at its output the signal C.

As is shown in FIG. 8, the signal T' at the output of flip flop 211 is almost always at the high level, or level 1, except after each negative pulse of signal T, which causes resetting of the output $\overline{Q}$. The signal T' then remains at the low level or level 0, until the next rising front of the signal S applied to its clock input. The signal T' is therefore at the level 0 during the above defined time shifts d.

The output signal S' from flip flop 212 is almost always at the low level and passes to the high level after each rising front of the signal T' applied to its clock input, but it is reset by the next down going front of signal S, applied to its input for resetting the output Q. The signal S' is therefore at the high level for each half period of signal S which follows the passage to the low level of the signal T', that is to say during a time equal to P/4.

The signal C, which results from the analog addition of signals T' and S' in the adder 213, and filtering of the resultant signal in the low pass filter 214 has then a mean DC voltage which depends on the time shift d. In fact, taking into account the relative range of variation of the output frequency of oscillator 22, the period P may here be considered constant. Thus, assuming the overall gain of the adder 213 and of filter 214 equal to unity, the voltage of signal C is equal to the value defining the high logic level of flip flops 211 and 212 if d is equal to P/4. In this case, in fact, the positive pulses of the signal S' compensate exactly for the low level pulses of signal T'. In FIG. 8, on the contrary, the case has been shown where d is slightly greater than P/4. Then the DC value of signal C is slightly less than the voltage defining the logic high level, shown with a broken line.

Naturally, adjustment of the overall gain of adder 213 and filter 214, as well as the possible introduction of a voltage shift, so as to make the signal C compatible with the control signal required for the oscillator 22, is within the scope of a man versed in the art.

Figure 9:
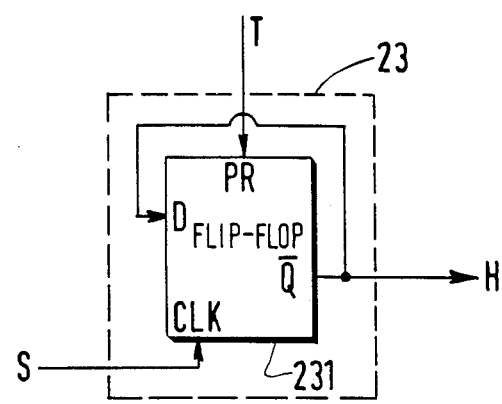
FIG. 9 shows a detail diagram of the divider circuit of the clock recovery circuit of FIG. 4.

Referring to FIG. 9, the frequency divider 23 comprises a D flip flop 231. The flip flop 231 has an input D and an output $\overline{Q}$ relooped to its input D, and delivering the signal H. The D flip flop also has a clock input receiving the signal S and an input for resetting the output $\overline{Q}$, receiving the signal T.

The operation of flip flop 231 as a divide by two frequency divider is well known to a man skilled in the art. To remove the ambiguity concerning the phase of signal H with respect to signal S, the low level pulses of signal T force the signal H to pass to the low level, if that is not the case. This ensures the phasing of divider 23 so that the rising fronts of signal S and of signal H which immediately follow the low level pulse of signal T coincide, as shown in FIG. 10;

Thus, the clock recovery circuit 2 is indeed synchronized by circuit 1 for detecting transitions between pairs.

Figure 11:
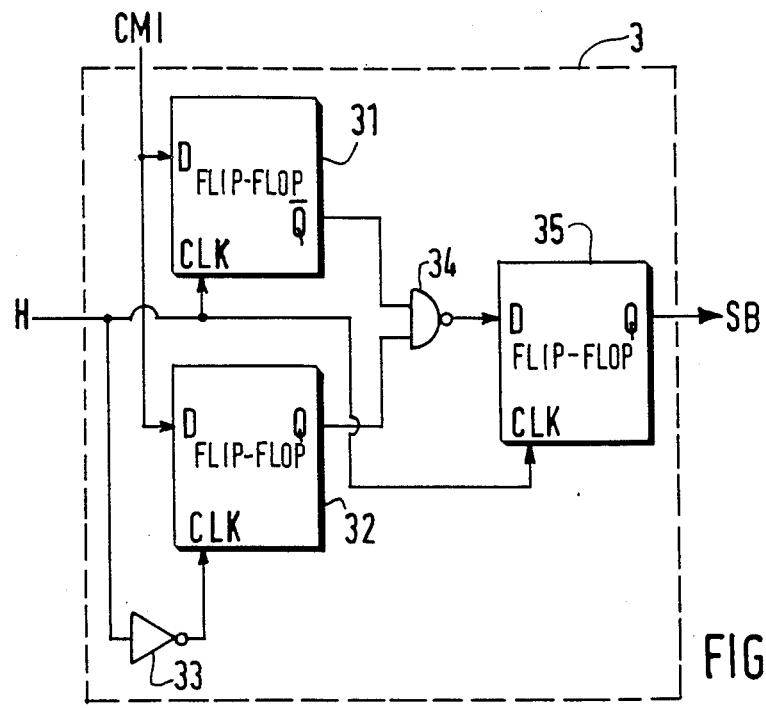
FIG. 11 shows a detail diagram of the decoding circuit of the device of FIG. 1.

Referring now to FIG. 11, the decoding circuit comprises three D flip flops 31, 32 and 35 an $\overline{\text{AND}}$ gate 34 and an inverter 33.

The flip flop 31 has an input D receiving the signal CMI, an output $\overline{Q}$ and a clock input receiving the signal H.

Flip flop 32 has an input D receiving the signal CMI, an output Q and a clock input receiving the signal H after inversion in the inverter 33.

The $\overline{\text{AND}}$ gate 34 has a first input connected to the output $\overline{Q}$ of flip flop 31, a second input connected to the output Q of flip flop 32 and an output.

Flip flop 35 has an input D connected to the output of the $\overline{\text{AND}}$ gate 34, an output Q delivering the signal SB and a clock input receiving the signal H.

The operation of the decoding circuit 3 is explained with reference to FIG. 12. In this FIGURE, is shown the signal CMI received as well as, on the upper line, the signal to be coded which served for producing it.

With synchronization of signal H on the transitions between pairs detected by the detector circuit 1, the rising fronts of signal H always take place during the first bit of a pair of coded bits of the signal CMI. The output $\overline{Q}$ of flip flop 31 recopies then the inverse of each first bit.

For the same reason, the rising fronts of the signal received by flip flop 32 at its clock input always take place during the second bit of a pair of coded bits of the signal CMI. The output Q of flip flop 32 therefore recopies each second bit.

The output of the $\overline{\text{AND}}$ gate 34 is therefore at the low level only if the first bit is at the low level and the second bit at the high level, that is to say if the coded pair is 01. In all the other cases, the output of the $\overline{\text{AND}}$ 34 is at the high level. Now, these other cases can only correspond to the pairs 00 and 11 since the pair 10 is never used.

Thus, the output Q of the flip flop 35 delivers a signal SB which indeed corresponds to the signal to be coded which served for producing the signal CMI.

It will be noted that the decoding circuit which has just been described is particularly simple for, because of the synchronization of the signal H, the prohibited pair 10 has not to be detected.

Figure 5:
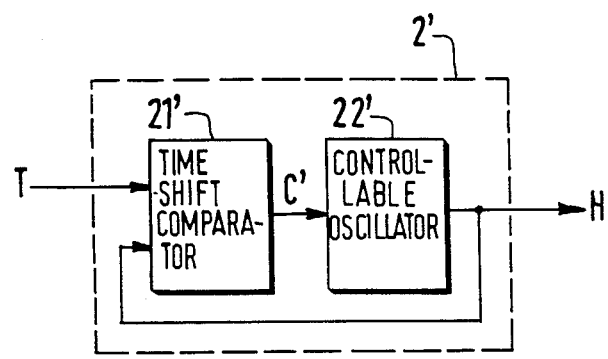
FIG. 5 shows a diagram of a variant of construction of the clock recovery device of the device of FIG. 1.

In the device which has just been described, an oscillator 22 is used followed by a divide by two frequency divider 23 for producing the signal H, the loop for controlling the time shift being formed from the output signal S of the oscillator. This arrangement has the advantage of a very good performance of the control loop in so far as its pick up range and its tracking range are concerned. This arrangement is however not obligatory and a clock recovery circuit 2' may be used of the type shown in FIG. 5, where block 21' designates a time shift comparator of the same type as comparator 21 and block 22' an oscillator of the same type as oscillator 22, but of half the frequency. The two inputs of comparator 21' receive the signal T and signal H and its output delivers a signal C' which controls the oscillator 22' delivering directly the signal H.

Naturally, the invention is not limited to the particular CMI coding used as basis for the description. In particular, it is within the scope of the man versed in the art to transpose the device to the case where a bit to be coded of value 0 is coded by means of the pair 10, the forbidden pair this time being the pair 01, or else to the cases obtained by inverting the values 1 and 0 of the bits to be coded.

What is claimed is:

1. A decoding device for receiving a coded succession of bits and outputting a decoded succession of bits, said coded succession being obtained by coding a succession of bits to be coded by converting each bit to be coded into a coded pair comprising two successive bits, a bit to be coded having one of two values which are associates, one of said two values having a single bit pair of different coded bits and the other of said two values having alternate bit pairs of identical coded bits, said decoding device comprising:
   a transition detection means for (i) receiving said coded succession of bits, (ii) detecting therein transitions between prohibited bit pairs having successive different bits opposite in order to the bit order in said single pair of different coded bits, and (iii) generating an output signal responsive to detection of said transition between said prohibited bit pairs,
   an oscillator for generating a periodic output signal,
   a time shift comparator, receiving said output signal from said transition detection means and said output signal from said oscillator, for determining a time shift between (i) each occurrence of one of said transitions between said prohibited bit pairs and (ii) a next rising edge of said output signal of said oscillator and for synchronizing said oscillator at a frequency dependent upon said time shift,
   a frequency divider, receiving said output signal of said transition detection means and said output signal of said oscillator, for providing a low level clock signal after each detected transition between said prohibited bit pairs, and
   a decoder means receiving said coded succession of bits and said clock signal from said frequency divider, for decoding pairs of bits which have their first bit occurring during a rising edge of said clock signal,
   wherein said time shift comparator comprises:
   (a) a first signal generation means connected to said transition detection means and said oscillator, for generating a first signal having a first level during said time shift and having a second level at all other times,
   (b) a second signal generation means, connected to said first signal generation means and to said oscillator, for generating a second signal having said second level during a predetermined time period after passage of said first signal from said first level to said second level and having said first level at all other times,
   (c) an analog adder for adding said first signal and said second signal, and
   (d) a low pass filter connected to said adder.

2. The decoding device as in claim 1, wherein said frequency divider is a divide by two divider.

3. The decoding device as in claim 1, wherein said decoding means comprises detection means for detecting said single bit pair.

4. The decoding device as in claim 3, wherein said detection means for detecting said single bit pair comprises (i) first means for detecting each first bit of a coded pair of successive bits of said coded succession, (ii) second means for detecting each second bit of a coded pair of successive bits of said coded succession and (iii) a logic gate connected to said first means and said second means.

* * * * *